United States Patent [19]
Sharper et al.

[11] Patent Number: 5,805,595
[45] Date of Patent: Sep. 8, 1998

[54] SYSTEM AND METHOD FOR COMMUNICATING PACKETIZED DATA OVER A CHANNEL BANK

[75] Inventors: Craig Alan Sharper, Los Altos; Nadia Sachs, Sunnyvale, both of Calif.

[73] Assignee: Cisco Systems, Inc., San Jose, Calif.

[21] Appl. No.: 735,478

[22] Filed: Oct. 23, 1996

[51] Int. Cl.⁶ ................................. H04J 3/24
[52] U.S. Cl. ................. 370/442; 370/462; 370/537
[58] Field of Search .................... 370/442, 443, 370/444, 447, 458, 459, 360, 375, 376, 357, 353, 389

[56] References Cited

U.S. PATENT DOCUMENTS

| | | | |
|---|---|---|---|
| 4,903,261 | 2/1990 | Baran et al. | 370/94.2 |
| 5,115,431 | 5/1992 | Williams et al. | 370/94.1 |
| 5,303,237 | 4/1994 | Bergman et al. | 370/237 |
| 5,315,588 | 5/1994 | Kajiwara et al. | 370/389 |
| 5,412,647 | 5/1995 | Giroux et al. | 370/232 |
| 5,434,866 | 7/1995 | Emerson et al. | 370/99 |
| 5,446,733 | 8/1995 | Tsuruoka | 370/232 |
| 5,448,564 | 9/1995 | Thor | 370/392 |
| 5,459,723 | 10/1995 | Thor | 370/392 |
| 5,461,626 | 10/1995 | Takase et al. | 370/94.1 |
| 5,467,344 | 11/1995 | Solomon et al. | 370/396 |
| 5,473,665 | 12/1995 | Hall et al. | 379/29 |
| 5,502,712 | 3/1996 | Akita | 370/225 |
| 5,513,172 | 4/1996 | Shikama et al. | 370/428 |
| 5,515,373 | 5/1996 | Lynch et al. | 370/365 |
| 5,521,914 | 5/1996 | Mavraganis et al. | 370/352 |
| 5,524,007 | 6/1996 | White et al. | 370/419 |
| 5,533,017 | 7/1996 | Thor | 370/419 |

*Primary Examiner*—Hassan Kizou
*Assistant Examiner*—A. Bnmmoussa

[57] ABSTRACT

A method for communicating packetized data over a communications link having a predetermined format including a framing using a channel bank having a time division multiplexing addressing scheme is disclosed in which a plurality of channel units may generate packetized data and the communications link may be allocated to a channel unit that is currently sending data over the communications link. The next sender of packetized data over the communications link may be determined by a system distributed over the plurality of channel units so that each channel unit independently determines whether it is the next sender. The communications link may be allocated to the channel unit that is the next sender of packetized data after the current sender of packetized data so that the time division multiplexing addressing scheme of the channel bank is ignored and the channel bank communicates packetized data. An apparatus for communicating packetized data over a channel bank is also disclosed.

37 Claims, 8 Drawing Sheets

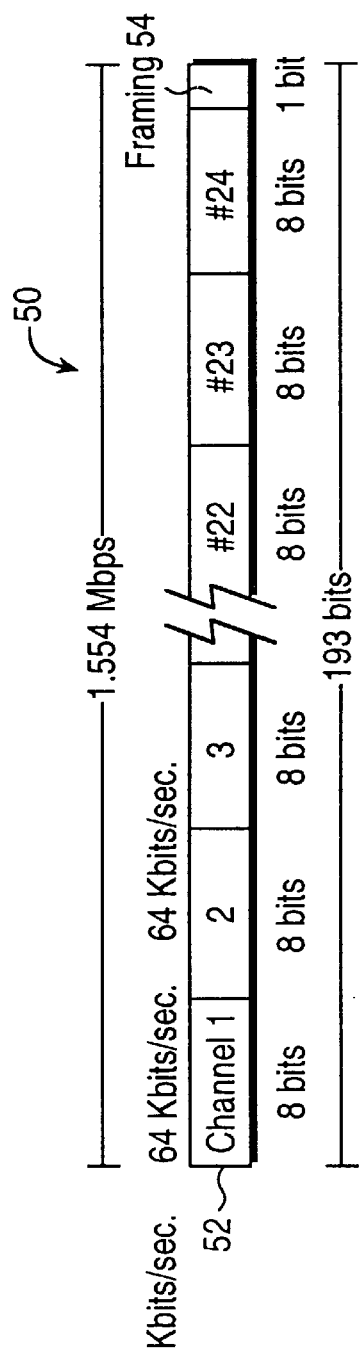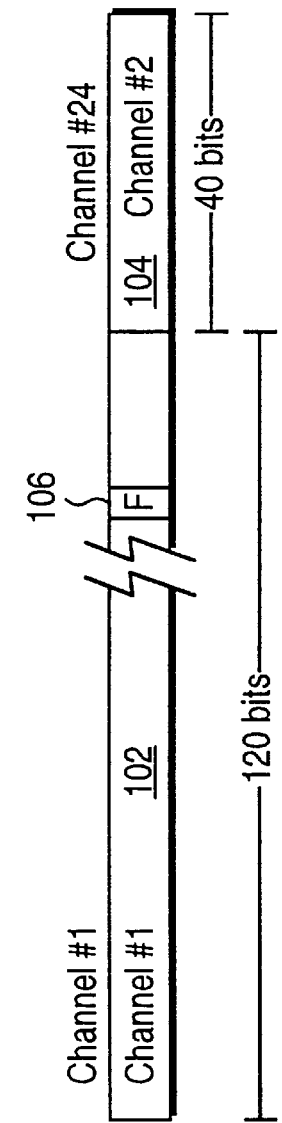

SYSTEM AND METHOD FOR COMMUNICATING PACKETIZED DATA OVER A CHANNEL BANK

BACKGROUND OF THE INVENTION

This invention relates generally to a system and method for communicating packetized data over a time division multiplexed communications system. In the early 1970's, telephone began using a time division multiplexed (TDM) communications system, known as D4, that used a channel bank to multiplex and communicate time division multiplexed (TDM) voice signals over a communications link, such as a T1 link. The channel bank typically carried 24 digital voice signals between central telephone offices using only one pair of wires in each direction instead of the normal 24 pairs of wires required to communicate the 24 voice signals in analog form. This capability was achieved by digitizing and time division multiplexing the 24 analog voice signals into 24 channels or timeslots. In the TDM system, each of the channels is allocated a predetermined, equal amount of time (corresponding to a predetermined bandwidth) within each frame of the T1 link to communicate any data. Each channel is always allocated its predetermined amount of time, even if that channel has no voice data to transmit. In addition to communicating voice signals, these system may also communicate digital data because the D4 system was designed to handle digital data. The systems are still widely used today to carry voice traffic between central telephone offices. Therefore, the communications hardware and the network necessary for this D4 system are readily available.

A typical time division multiplexed (TDM) system, such as the D4 system, has a data rate of 1.544 million bit per second (Mbps) wherein timeslots of 64 Kbps are fixedly allocated to each channel unit. The 1.544 Mbps data rate is typically known as a T1 carrier.

Because conventional channel banks, such as the D4 system, have allocated fixed time slots for each channel, these systems suffer from an inefficient use of bandwidth and cannot dynamically allocate that bandwidth. For example, if one or more channels do not have any voice or data signals to transmit at a particular time, the timeslot assigned to that channel unit in the T1 frame is unused. In addition, if a particular channel has a need for more bandwidth than the allocated time slot, the TDM system does not allow that channel to request or receive any extra bandwidth. Due to these shortcomings, a number of alternative packet-based communications systems, such as asynchronous transfer mode (ATM), X.25 protocol, and frame relay, have been developed that do not assign fixed timeslots to each channel, but dynamically allocate bandwidth according to need. These packet-based communications systems are best used for digital data because digital data tends to be communicated in bursts. For example, a user sending a computer file that is 100 Kbytes long will need to send the entire 100 Kbytes as quickly as possible, but then will not require any more bandwidth until another transmission.

These packetized communications systems permit the total bandwidth of the communications link to be allocated in any manner depending on the need of the channels. For example, a single channel may use the entire bandwidth for several seconds because that channel has high priority digital data, such as an e-mail message or a computer file, that must be transmitted immediately. Most of the packetized communications systems provide some system for preventing any particular channel from over-using the communications link. These packetized systems, however, cannot use the hardware of an existing time division multiplexed channel bank, such as D4. Therefore, these packet-based systems require specialized hardware.

Thus, there is a need for a system and method for communicating packetized data over a channel bank, which avoids these and other problems of known devices, and it is to this end that the present invention is directed.

SUMMARY OF THE INVENTION

The invention provides a system for communicating packetized data over a channel bank previously used to communicate TDM data wherein the existing hardware of the TDM system may be used to communicate packetized data, which reduces the hardware cost of the packetized data communication system in accordance with the invention. In addition, the packetized data communications system in accordance with the invention may use existing data buses within the channel bank to communicate between the channel units. The invention also provides a system for communicating packetized data over the channel bank wherein a distributed contention system may be used such that each channel unit independently determines whether it has gained access to the channel bank. The packetized data communications system in accordance with the invention may have a system for preventing a channel unit from overusing the communications system.

In accordance with the invention, an apparatus for communicating packetized data over a communications link using a channel bank having a time division multiplexing addressing scheme, the communications link having a predetermined format for data transmitted over the communications link including a framing bit and a frame period defined by the framing bit, wherein the apparatus comprises a plurality of channel units for generating packetized data, each piece of packetized data having a packet period corresponding to a sufficient amount of time to communicate the packetized data over the communications link, a system for allocating the communication link to a channel unit that is currently sending data over the communications link for the packet period, a system for skipping the framing bit when communicating said packetized data if the framing bit occurs during the packet period, a system for determining a next sender of packetized data over the communications link, the determining system being distributed over the plurality of channel units so that each channel unit independently determines whether it is the next sender, and a system for allocating the communications link to the channel unit that is the next sender of packetized data after said packet period so that the time division multiplexing addressing scheme of the channel bank is ignored, and the channel bank is communicating packetized data. A method for communicating packetized data over a channel bank is also disclosed.

BRIEF DESCRIPTION OF THE DRAWINGS

FIG. 2 is a diagrammatic view showing the format of a time division multiplexed signal generated by the conventional TDM system of FIG. 1;

FIG. 4 is a schematic showing a format of the signals generated by the system for communicating packetized data over a channel bank in accordance with the invention;

DETAILED DESCRIPTION OF A PREFERRED EMBODIMENT

The invention is particularly applicable to a system and method for communicating packetized data over a D4 channel bank. It is in this context that the invention will be described. It will be appreciated, however, that the system and method in accordance with the invention has greater utility.

Figure 1:
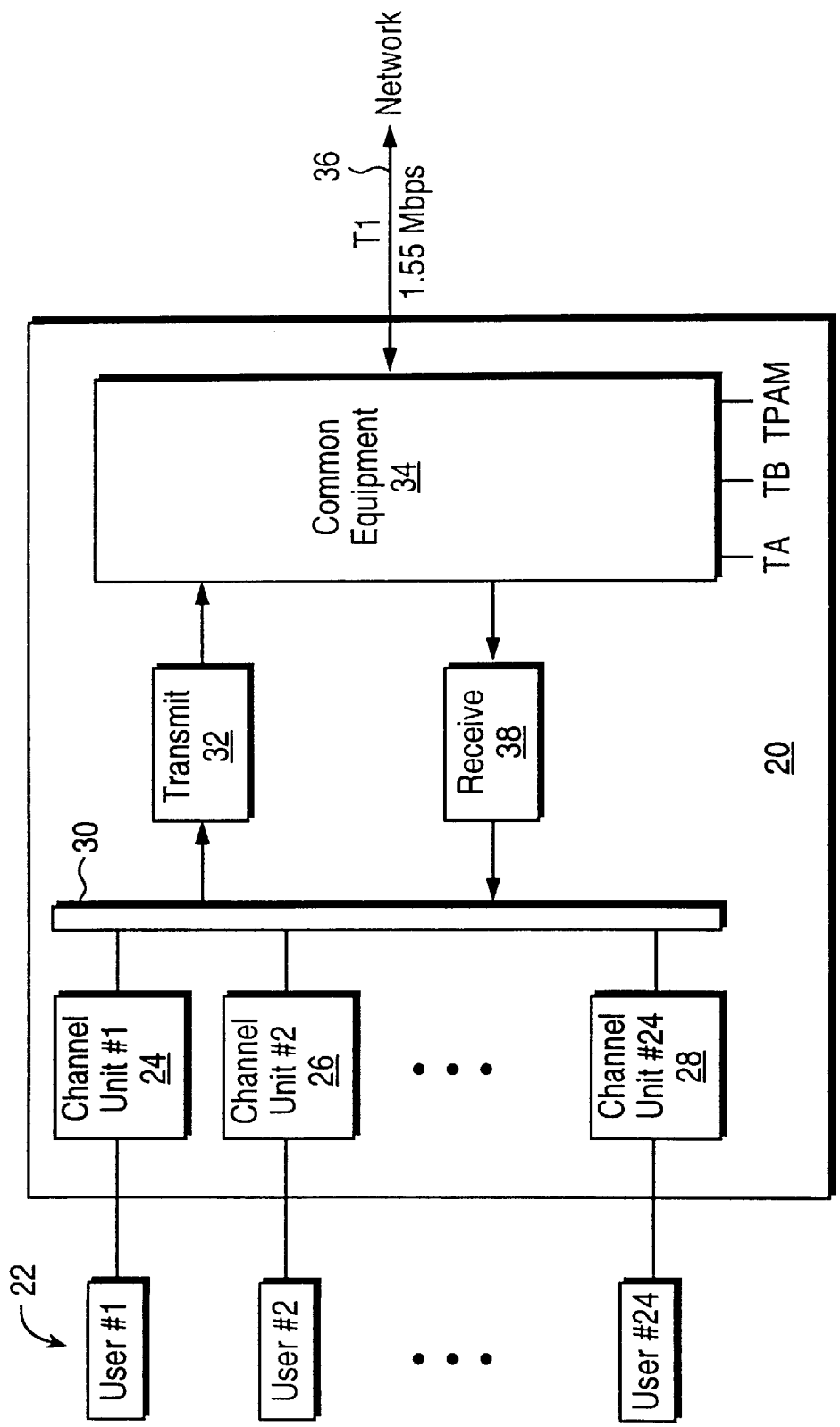
FIG. 1 is a block diagram of a conventional time division multiplexed (TDM) communications system having a channel bank.

FIG. 1 is a block diagram of a conventional time division multiplexed (TDM) communications system channel bank 20. The channel bank communicates a plurality of signals from a plurality of users over a communications link wherein each of the users has a specified timeslot assigned to it in which it can communicate data over the communications link. The TDM system shown is a D4 channel bank, but the invention is not limited to a particular type of channel bank.

The D4 channel bank 20 may be used by a plurality of users 22 connected to a plurality of channel units 24–28, and the plurality of channel units may be known as a channel bank. In the D4 system shown, there are a maximum of twenty-four users and a maximum of twenty-four channel units so that there is a one-to-one correspondence between channel units and users. As described below in more detail, each channel unit has a fixed 8-bit timeslot assigned to it, in which that channel may communicate data. Each channel unit may communicate analog voice signals or digital data signals, as described below. For transmission, the data generated by any channel may be sampled eight thousand (8000) times per second so that eight thousand 8-bit samples (for a total of 64 Kbps data rate for each channel) may be generated for each channel, as described below in more detail.

The details of the D4 TDM communications system will now be described. For time division multiplexing in a D4 system, each of the twenty-four analog voice signals are low pass filtered and sampled at a rate of 8000 time per second by a voice card. Each of these analog samples are digitized to form 8-bit digital samples by a well-known analog-to-digital converter and then these twenty-four 8-bit digital samples are concatenated together to form a 192-bit signal as shown in FIG. 2. These voice cards also communicate signalling information, such as ringing indication, idle indication or busy indication, required by the voice signals using two signalling bits known as A and B.

The TDM D4 system may also send digital data using a data card to replace one or more of the voice cards. For digital data, there is no need to sample or digitize the digital data and there are not any signalling information. Therefore, the D4 system has a TNEN bus for indicating to the transmit unit and the receive unit whether analog voice signals or digital data is being communicated. As described above, the common equipment acts as an interface between the transmit and receive unit and the T1 link.

During the transmission of data by a channel unit, the channel unit transmits the analog voice or digital data to a backplane bus 30 which sends the data from all of the channel units to a transmit unit 32. The transmit unit converts the analog voice signals to digital signals and then sends the digital voice and data signals to a common equipment 34. The common equipment may control the channel units in order to fixedly allocate a data rate to each channel unit using a control bus and may transmit the digital data over a T1 link 36. As is well known, the T1 link may have a date transfer rate of 1.544 million bits per second (Mbps).

In more detail, during transmission, the transmit unit gives each channel unit some addressing signals, TSP and TSQ that provide a unique address for each channel unit and indicates to each channel unit where in the T1 frame the timeslot for that channel unit is located. The transmit unit also gives each channel unit that communicates digital data a clock signal, TDCLK, and a serial data bus, TDATA. Each data channel unit transmits digital data over the TDATA bus only during its timeslot. The voice cards, also known as voice channel units, do not use the TDATA bus.

For the transmission of analog voice signals, a slightly different system is used. At the time that the D4 system was designed, analog to digital (A/D) and D/A converters were too expensive so a single high speed A/D converter was built into the transmit unit and a D/A converter into the receive unit to handle the conversion of analog voice signals. Therefore, there is a bus, called TPAM, between the voice channel units and the transmit unit that carries analog signals. Thus, during its assigned timeslot, a voice channel unit is enabled by a TWD signal to place an analog voltage onto the TPAM bus. The signalling information, as described above, for the voice signals are sent to the transmit unit over a TA and TB bus. The digital data channel units do not use the TPAM, TA or TB buses.

For receiving voice and digital data signals, the receive unit provides addressing leads, RSP and RSQ, to the channel units that provide a unique receive address to each channel unit so that each channel unit may identify its timeslot of the T1 link. Each channel unit also receives a clock signal, RCLK. The digital channel units also receives the received digital data on a RNPCM bus where the channel unit may latch onto the appropriate 8 bits of digital data during its timeslot. For analog signals, the signals are converted back into analog signals by the D/A converter in the receive unit and then placed on an RPAM bus and a RWD signal from the receive unit indicates to each channel unit when to store the analog voltage on the RPAM bus. The signalling information is placed on a RSAB bus. To more fully understand the TDM system, the format of the TDM signal will be briefly described.

FIG. 2 is a schematic of a format of the signals generated by the channel bank shown in FIG. 1. A TDM signal 50 may be 193 bits long and may include an 8-bit sample 52 for each of the twenty-four channel units and a framing bit 54. Each of the channels may be sampled eight thousand (8000) times per second, so that the total data rate for each channel is sixty-four thousand bits per second (64 Kbps), and the total data rate of all of the data and the framing bit is equal to the total data rate of the T1 link, which is 1.544 Mbps. However, if one or more of the channel units does not have any data to communicate, then the timeslot assigned to that channel unit may be unused and some bandwidth of the T1 link is wasted. A system for transmitting packetized data over a channel bank in accordance with the invention will now be described, which may reduce or eliminate this wasted bandwidth.

Figure 3:
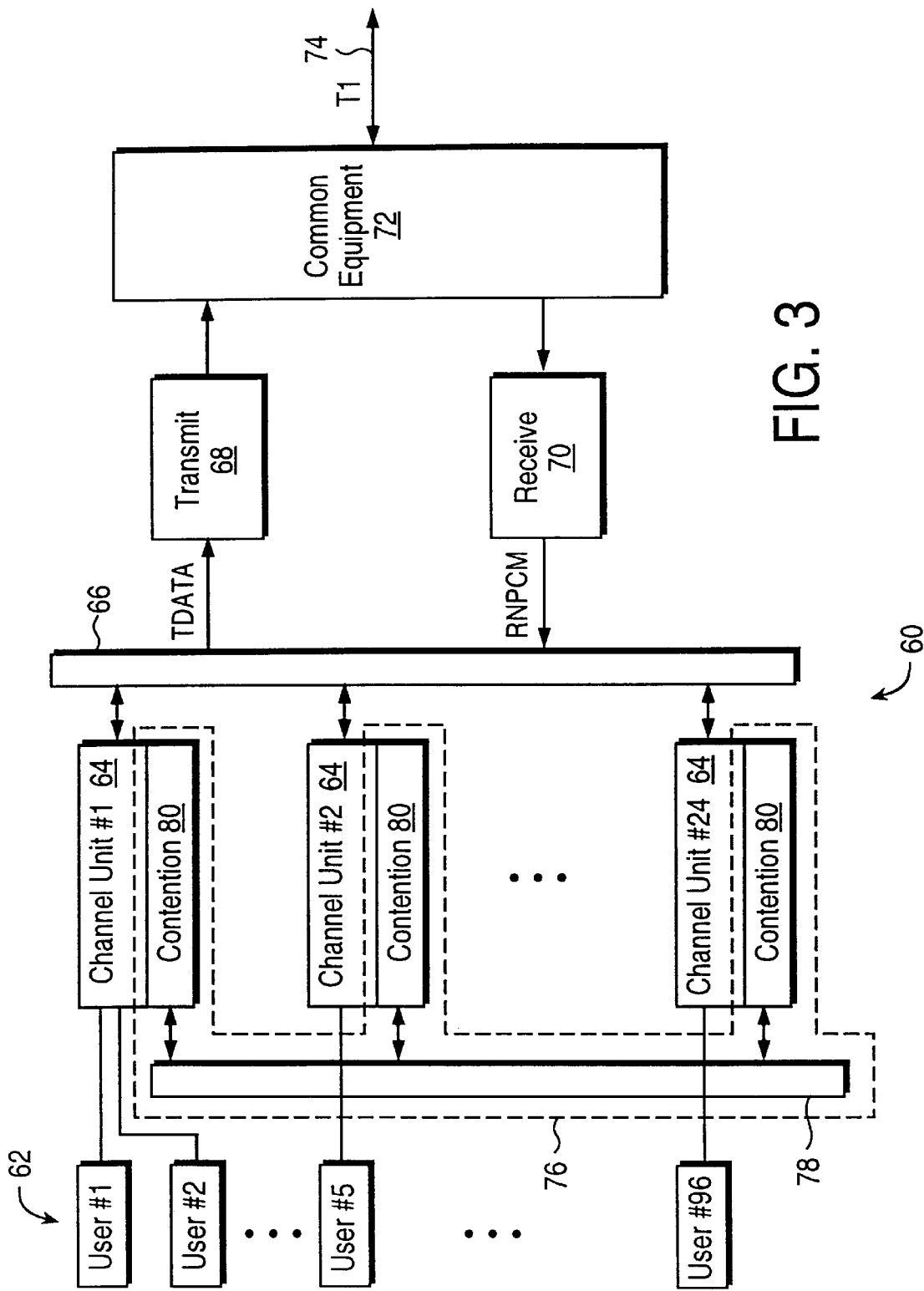
FIG. 3 is a block diagram of a system for communicating packetized data in accordance with the invention that may use an existing channel bank.

FIG. 3 is a block diagram of a system for communicating packetized data over a channel bank in accordance with the invention. Since the packetized data is not assigned any particular timeslot, the otherwise wasted bandwidth associated with TDM communication systems with fixed timeslots may be reduced or eliminated, as described below. A channel bank 60 may have a similar structure to the channel bank described above, including a plurality of users 62 connected to a plurality of channel units 64, a backplane bus 66, a transmit unit 68, a receive unit 70, and common equipment 72 attached to a T1 communications link 74. Each of these systems operate in a similar manner to the systems in the channel banks described above. The channel bank 60 shown, however, may also have a system 76 for communicating packetized data over the TDM communication system in accordance with the invention in which each channel unit may contend for access to send packetized data over the T1 communications link. The common equipment still attempts to assign a fixed timeslot to each channel unit by sending addressing signals as described above, but each channel unit ignores those addressing leads and sends packetized data over the T1 link using a channel bank. When a framing bit of the T1 link occurs during the transmission or reception of packetized data, the framing bit of the T1 link is skipped so that the channel bank sees the framing bit and believes that it is still communicating time division multiplexed data even when packetized data, in accordance with the invention is being communicated.

Since there are not any fixed time slots in a packetized data communications system, there needs to be some system for determining which of the channel units gains access to the bus. Without some contention or arbitration system, each of the channel units may try to send data at the same time. Therefore, a contention system determines, based on some criteria, which of the channel units is going to send data next over the communications link. A contention system in accordance with the invention will be described below.

The system for communicating packetized data over the TDM communication system may include a contention bus 78 that may be connected to a contention system 80 located within each of the channel units 64. In the channel bank 60 that communicates packetized data, the TA, TB and TPAM buses of the D4 system, as described above, are used only for voice signals and voice signalling information, and not needed for the packetized data communication system in accordance with the invention since the packetized data is digital and there are no telephone signalling information. Therefore, any one or more of these existing buses may be used for the contention bus 78 in accordance with the invention. In the examples shown below, the TB bus may be utilized as the contention bus. As shown, the contention bus may be connected to each channel. Each channel, in turn, has a contention system 80 physically located within each channel unit 64. Unlike most conventional packetized communications systems that have a centralized processor that handles priority and contention issues, the contention system in accordance with the invention is a distributed contention system that is spread over each channel unit and uses existing buses. A TDATA bus may communicate data between the backplane bus and the common equipment.

The system for communicating packetized data over a channel bank in accordance with the invention allows a D4 channel bank to multiplex multiple customers onto a T1 link using a packetized data protocol, such as frame relay protocol instead of the TDM format described above. One of the advantages of the bus architecture of D4 is that, except for the addressing signals TSP/TSQ/RSP/RSQ, all of the 24 channel units are on the same bus. Therefore, for transmitting packetized data, such as frame relay data, one may ignore the addressing leads and treat the TDATA and RNPCM buses as unformatted data busses so that all channel units may send and receive data packets over these data buses. To accomplish this, however, the framing bit 54 must be maintained. The transmit unit 68 and the receive unit 70 still need to use this bit so the channel unit needs to identify it so as to avoid using it. Each channel unit does this by counting the number of TDCLK counts between successive occurrences of TWD for the transmit direction and the number of RCLK counts between successive occurrences of RWD in the receive direction. Since TWD and RWD occur every timeslot, there are normally 8 clocks between successive occurrences. During the framing bit, however, there will be 9 clocks between occurrences. This difference allows us to determine where the receive and transmit framing bits are located and avoid overwriting them with packetized data. Some other implementations of the transmit unit 68 remove the clock edge during the transmit framing bit. In this case all of the occurrences in the transmit direction will be 8 bits, but it doesn't matter since the lack of a clock will automatically prevent us from using the transmit framing bit.

In the receive operation, once the receive framing bit has been identified, all of the channel units in the channel bank look for frames addressed to themselves on RNPCM. To identify frames of data, these frames can start anywhere and have no relationship to the T1 framing bit which makes it necessary to have some protocol to address the frames. The frame relay protocol has a 10-bit address, called the DLCI, at the start of each frame that is usually used to identify one of 1024 sub-channels of a single user. For the system in accordance with the invention, most significant 5 bits of the DLCI may be used to identify to or from which of the 24 channel units the frame is addressed. Since there are only 24 channel units, the values 0 and 25 to 31 are not used for normal addressing, and may be used for other purposes such as network management. In our implementation, these DLCIs may be treated as broadcast signals so that all channel units receive them. Each channel unit buffers all the frames it sees on RNPCM where the most significant 5 bits of the DLCI match it's slot number or is 0 or 25 to 31. Inside each channel unit, the next 2 bits of the DLCI are used to identify which of the 4 customers attached to that channel unit is to receive the frame. The remaining 3 bits of the DLCI may be given to the customer to identify up to 8 sub-channels, if desired. Therefore, each frame of packetized data has an address, such as the DLCI for frame relay data, located at the beginning of the frame.

In the transmit direction, the use of an addressing protocol, such as the DLCI, to identify the channel unit, customer, and sub-channel the frame is coming from is the same as the receive direction. The transmission of packetized data over a channel bank is more complicated because only one channel unit may transmit at any given time, so a mechanism, such as the contention system 76, must be present to determine which channel unit gets to send data at any given time. A problem, however, is that there are no spare data busses on the D4 backplane to allow the channel units to communicate with each other and to negotiate. The system in accordance with the invention solves this problem by recognizing that any TDM based voice channel units will never be plugged into the same channel bank with the channel units 64 in accordance with the invention since these voice channel units require TDM operation. Therefore, the TNEN bus will never indicate an analog signal and the transmit unit 68 will never need to use TA, TB, or TPAM. Therefore, the system in accordance with the invention may use these busses to allow the channel units 64 to communicate and determine who gets control of the TDATA bus and which channel unit may send a frame of packetized data. In the preferred embodiment, only the TB bus was used, however any of the buses or a combination of the buses may be used to communicate between the channel units.

In order to insure that multiple customers receive approximately equal access to transmit packetized data and no customer over-uses the system in accordance with the invention, a limit on the amount of packetized data each customer has recently sent during a time interval is desirable. The amount of packetized data may be limited to a predetermined number of frames of packetized data, a predetermined number of bytes of packetized data, or a combination of both. Each customer may be limited to a given amount of packetized data that may be sent during the time interval. In addition, if all channel unit with packetized data at that priority level have exceeded their limits during the time interval, then the limits for all of the channel units are reset for that priority. Packetized data for each customer may also be assigned a 5 bit dynamically changing priority as described below in more detail. The instantaneous value for the priority is based on how much a particular customer is above or below his allocation. Highest priority may be given to customers that are well below their allocation, middle values of priority may be for customers that are just using their allocation, and increasing lower priority may be given to customers that are well above their allocation. This is a type of negative feedback since sending packetized data decreases your priority which gives other customers a chance to send data. Once a channel unit has had a chance to send data at a given priority level, it cannot send data again at that priority level during the time interval until all other cards that have packetized data at that priority level have had a chance to send a frame of packetized data at that priority level.

The contention mechanism may have a plurality of contention periods, as described below, during each T1 frame. The actual number and location of these contention periods is not important, only that all the channel units in the channel bank know where the start of each contention period is, either by predetermination or some other signaling mechanism. Following contention, a given channel unit may be the CurrentSender or the NextSender, or both, as described below. At any given time, however, there may be only one CurrentSender and one NextSender in the channel bank. The CurrentSender is the channel unit that is currently using the TDATA bus and the NextSender is the channel unit that has won the contention process but has not yet started sending data on TDATA.

FIG. 4 is a schematic diagram of a single T1 frame 100 containing packetized data in accordance with the invention that may be communicated over a channel back. In the example shown, a first channel unit signal 102, and a second channel unit signal 104 are shown. As described above, the timeslots in the T1 frame are ignored. Thus, the first channel unit communicates its packetized data until all of the packetized data has been communicated. In this example, the first channel unit communicates 120 bits of data during the T1 frame shown and the second channel unit communicates only 40 bits of data during the T1 frame shown. In accordance with the invention, it may be that a single channel unit may completely use the entire 192 bits in a T1 frame for some period of time. For transmission, once a 192-bit signal is generated, a framing bit 106 may be added to the end of the 192 bits by the common equipment to form the appropriate length T1 frame of 193 bits. When a channel unit transmits packetized data over the channel bank, in accordance with the invention, that would overlap the framing bit position, the framing bit is skipped so that the framing bit may be added by the common equipment, and then transmission continues in the next T1 frame. Now, the detailed structure of an embodiment of a contention system will be described.

Figure 5:
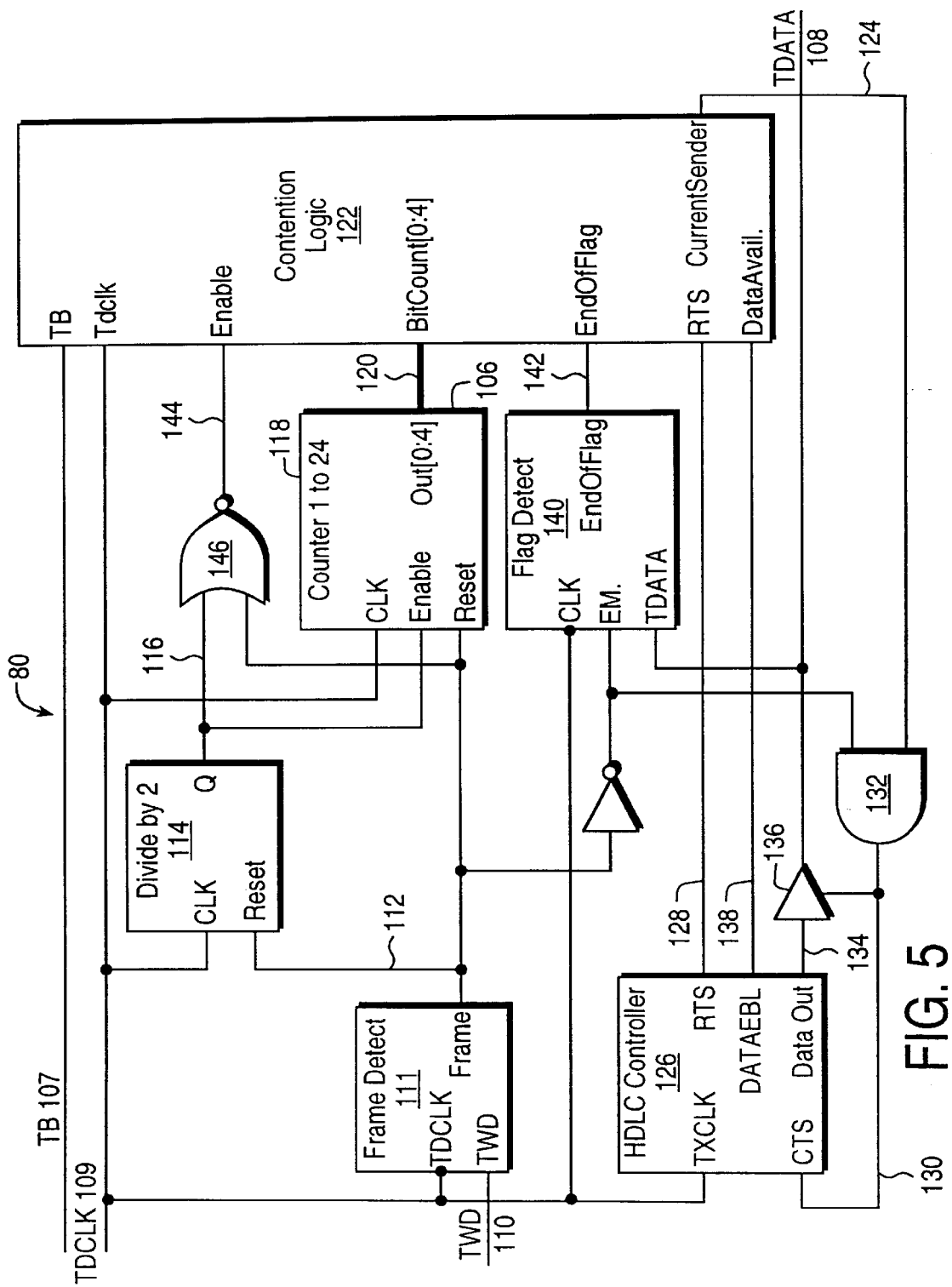
FIG. 5 is a schematic diagram of a system for communicating packetized data over a channel bank in accordance with the invention.

FIG. 5 is a schematic block diagram of an embodiment of the contention system 80 of FIG. 3. As described above, in this embodiment, a TB bus 107 may be used to communicate contention data between the channel units. The contention bus is an open collector bus that uses the TB bus in the D4 system, or one or more of the buses, TA, TB or TPAM that are normally used for voice signalling. The contention bus is pulled low by one or more of the channel units or kept high by a resistor, as described below. The other buses, TDATA 108, TDCLK 109, and TWD 110 are D4 backplane signals, as described above, that may be used by the contention system 80 to interface with the rest of the TDM communication system. In particular, the data generated by each channel unit is outputted over the TDATA bus 108, and the clock signal for the TDM system is carried over the TDCLK bus 109 so that the contention system may be synchronized with the TDM system. The signal on the TWD bus 110 may indicate the beginning of each of the twenty-four TDM timeslots. It should also be remembered that each channel unit within the channel block has a contention system because the contention system is distributed over all of the channel units. For clarity, the description of the contention system will be only for a single channel unit, but each channel unit may have a similar system that may operate in a similar manner.

The contention system 80 may include a frame detect unit 111 that may detect the T1 framing bit so that it may be ignored and it may be used to reset the contention system in each channel unit. To determine the beginning of each new T1 frame, the frame detect unit may be clocked by the 1.544 MHz TDM system clock signal on the TDCLK bus 109. Each clock pulse represents a single bit of the total 1.544 Mbps. The frame detect unit may also use the signal on the TWD bus 110, which goes high in the middle of each of the twenty four time slots. The frame detect unit may count the number of clock pulses on the TDCLK bus that occur between rising edges of the TWD signal. Normally, since each time slot has 8 bits, as described above, there should be 8 clock pulses between successive signals on the TWD bus. However, at the end of a T1 frame when the framing bit is added, there are nine clock pulses during the period between successive TWD pulses. When the framing detect unit detects a odd number of clock pulses during the period between successive TWD pulses, the frame detect unit may output a framing bit signal 112 that may be used to reset several counters within the contention system that determine when contention may be done.

A counter 114 divides the 1.544 MHz clock signal on the TDCLK bus in half so that the location of the contention bits, as described below, may be properly aligned with the 1.544 MHz clock signal. An enable signal 116 may be generated by the counter which causes contention bits, as described below, to be generated on the contention bus, TB in this example, beginning at the falling edge of the enable signal 116. A second counter 118 may be clocked by the clock signal and may count 24 bits of each contention period. In this embodiment, the 192-bit signal may be divided into four contention periods, each of which is twenty-four bits long, but operates at half the clock speed to provide sufficient time for the contention process. The invention, however, is not limited to any particular number of contention periods.

The second counter 118 may be enabled by the enable signal 116, and reset at the end of each 193-bit T1 frame by the framing bit signal 112. The second counter may output a count value 120 that may be 5 bits and may determine which contention bit is being output by each contention system in each channel unit, as described in more detail below. The 5-bit count value may cycle from 1 to 24, in this embodiment, four times during each 193-bit TDM frame. This count value docks the four 24-bit contention periods. The 5-bit count value may be fed into a contention logic 122 whose operation and detailed structure will be described below with reference to FIG. 6. Briefly, the contention logic contends with other contention logic in each channel unit to determine which channel unit may get access to the TDATA bus by using the TB bus 107 to communicate the contention bits. When a particular channel unit has been selected by the contention systems in the channel units, as the Current-Sender of data, as described below, the contention logic of that channel unit raises a CurrentSender signal 124 high so that the channel unit may communicate data over the TDATA bus 108. The CurrentSender signal may be used to control a HDLC controller 126.

The HDLC controller is well known in the art and may generate HDLC frames that are going to be communicated over the TDATA bus 108. The HDLC frames may be a series of data bits separated by flag bits. The flag bits may be represented by the bit sequence "01111110" which may be used to separate frames of packetized data and may also be used for filling in idle conditions between frames. The sequence of bits in the flag never occurs within a frame of packetized data. The signal formatting controller may be clocked by the clock signal on the TDCLK bus 109. When the signal formatting controller has data to be sent, a Request_To_Send (RTS) signal 128 is raised high. When the RTS signal is raised high, the contention logic 122 will begin contending with the other channel units for permission to send the data over the TDATA bus, as described below in more detail. The signal formatting controller may be controlled by a Clear_To_Send signal 130, which may be low when the CurrentSender signal is low, indicating that the particular channel unit may not send data over the TDATA bus yet. The CTS signal may be generated by an AND gate 132 that prevents the CTS from going high if the framing bit has been detected. This prevents the contention system from sending data during the framing bit. However, when the CurrentSender signal goes high, indicating that the contention logic has won permission to send data over the TDATA bus, data may be sent out over a DataOut bus 134 that may be connected to a buffer 136. The buffer may also be controlled by the CTS signal so that data is output from the buffer to the TDATA bus only when the CTS signal is high and is high impedance otherwise. The signal formatting controller may also have a data enable (DATAEBL) signal 138 that may be high when the controller is sending data bits and may be low when the controller is sending flag bits. This signal may indicate to the contention logic through a DataAvail input when the actual data bits, instead of flag bits, are being sent. The signal formatting controller may only send a single frame each time both the RTS and CTS signals are high.

A flag detector 140, may be clocked by the clock signal, and may monitor data output over the TDATA bus 108 by the buffer 136 and may output an EndOfFlag signal 142 during the transmission of flag bits over the TDATA bus. To detect flag bits, the flag detector detects the "01111110" bit sequence, as described above. The flag detector is enabled by an EBL signal only when the framing bit signal 112 is low, indicating that no framing bit has been detected.

The contention logic 122 may be enabled by an ENABLE signal 144 that may be generated by a NOR gate 146, and may generate an inverted version of the enable signal 116 used for the second counter 118. The enable signal has been inverted because the counter 118 may change its count at the start of each new contention bit, but the contention logic may sample the TB bus in the middle of the contention bit time period. In order to skip the framing bit, the framing bit signal 112 is also fed into the NOR gate 146. Now, the details of an embodiment of the contention logic 122 will be described.

Figure 6:
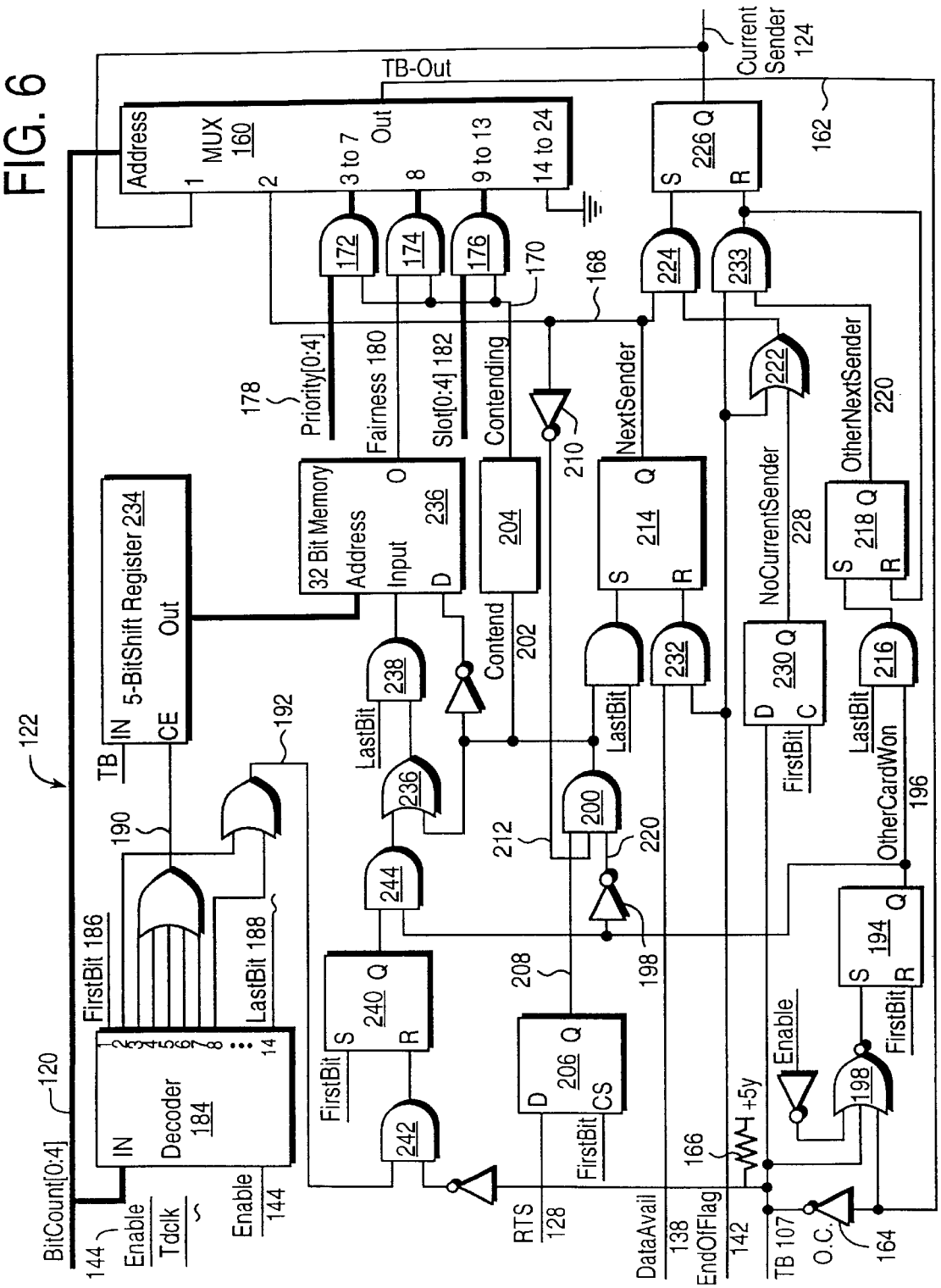
FIG. 6 is a detailed schematic diagram showing an embodiment of the contention logic of FIG. 5.

FIG. 6 is a schematic diagram of an embodiment of the contention logic 122 shown in FIG. 5. Although not shown for clarity, each of the flip-flops shown in FIG. 6 may be docked by the 1.544 MHz clock signal on the TDCLK bus. As described above, the bit count signal 120 may indicate the beginning of each of the twenty-four contention bit time periods during each contention period. A multiplexer 160 may be used to select the contention bit to be output on the TB bus 107 during each of these twenty-four contention bit time periods from a plurality of signals attached to the multiplexer. The format of the bits sent out by the contention logic over the TB bus are described in more detail below with reference to FIG. 8. The output signal from the multiplexer may be a TBOut signal 162 which may be inverted by an inverter 164, such as an open collector inverter, prior to be placed on the TB bus. The open collector inverter may only pull the TB bus low when a positive signal is generated by the multiplexer. Thus, a high signal from the multiplexer results in a low signal on the TB bus, which has advantages that are described in more detail below. If no contention system within any of the channel units in the communications system is pulling the TB bus low, then the TB bus may be kept high by a resistor 166 connected to a power supply. As described below with reference to FIG. 8, the first 13 bits of the contention period may be used and bits 14 to 24 are unused so that the inputs 14–24 of the multiplexer are tied to ground. Briefly, each channel units sends inverted contention bits so that a priority of four ("0100") becomes 1011 on the TB Bus. Then, each channel unit knows that it has lost the contention process if it is trying to send a "0" in a bit position (which would result in a 1 on the TB Bus) and the TB bus is a "0". The purpose of each contention bit will now be described.

During the first contention bit, the multiplexer may output a high signal representing the CurrentSender signal 124 if the particular channel unit that the multiplexer is located within currently has control of the TDATA bus and is currently sending packets of data over the communications system. During the second contention bit, the multiplexer may output a high signal based on a NextSender signal 168 if the particular channel unit has been selected to be the next sender of packetized data over the communications link. The NextSender signal may be generated by the contention logic, as described below, if the channel unit has won the contention process. During the third through thirteenth contention bits, the output of the multiplexer depends on a Contending signal 170. The details of the contending signal will be described below. When the Contending signal is high, indicating that the particular channel unit is still contending to send data during the next frame, contention bits three through thirteen may be generated. When the Contending signal is low, indicating that the channel unit has already lost the contention process for the next frame, a set of AND gates 172, 174, 176 prevent any bits from being sent by the multiplexer for contention bits three through thirteen. If the channel unit has already lost the contention process, there is no reason for the contention logic within that channel unit to continue to send contention bits. When the next contention period begins, the AND gates will be reset so that the channel unit may again contend.

If the Contending signal 170 is high, then signals may be generated that are fed into the multiplexer and out over the TB bus. The third through seventh contention bits may hold a value of a priority 178 of the data that the particular channel unit wants to send. The priority may be generated by software within the communication system. In the contention process, a channel unit with higher priority data will always win over a channel unit with lower priority data so that the higher priority data will not be delayed by the communications system. During the eighth contention bit, a fairness bit 180 may be generated, as described below, and sent over the TB bus by the multiplexer. During the ninth through thirteenth contention bits, a slot signal 182, indicating which slot the particular channel unit is plugged into, may be generated and sent over the TB bus by the multiplexer. The slot signal 182 may be determined by the hardware of the channel bank, as is known in the art.

A decoder 184 may decode the count on bit-count signal 120 when the Enable signal 144, as described above, is high. The decoder outputs timing pulses for the first through eighth contention bits, and for the fourteenth contention bit, which is the first unused contention bit. For example, a FirstBit signal 186 may be output during the first half of the first contention bit, and a LastBit signal 188 may be generated during the first half of the fourteenth contention bit. A third count signal 190 may be generated during the first half of the third through seventh contention bits, and a fourth count signal 192 may be generated during the first halves of the second and eighth contention bits.

A latch 194, that may be a R-S flip-flop, may be used to generate an OtherCardWon signal 196 which indicates that some other channel unit, other than the particular one with this contention logic, has already won the contention process and will be the next sender. The flip-flop may be held reset during the first contention bit by the FirstBit signal 186 attached to the reset input of the flip-flop. A logic gate 198, such as a NOR gate, may be used to set the flip flop if the particular channel in which the contention system is located has lost a contention bit. A particular channel may lose a contention bit when the multiplexer 160 attempts to output a low TBOut signal 162, as described below, which causes the inverter 164 to go high, but the signal on the TB bus is already low because another channel unit has pulled it low and won the contention process over the particular channel unit. Once the particular channel unit has lost the contention process for any contention period of twenty-four bits, the OtherCardWon signal 196 goes high and remains high until the beginning of the next contention period. This signal causes a high signal at an input of an inverter 198, and a low signal at an input of a logic gate 200, that may be an AND gate. This in turn causes a Contend signal 202 to go low. This Contend signal is delayed by a latch 204 so that the Contending signal 170 goes low a single dock cycle later. As described above, the Contending signal 170 prevents the multiplexer from generating contention bits over the TB bus for the remainder of the present contention period if the channel unit has already lost the contention process. Now, the system for determining when the contention logic should start contending for a frame is described.

As described above, a high RTS signal 128 indicates when each contention system within each channel unit should begin contending for control of the TDATA bus. When the RTS signal goes high at the beginning of a new contention period and the FirstBit signal 186 goes high, a latch 206 that may be a flip flop generates an output signal 208 that goes high. The output of the latch 206 may be input into the AND gate 200, described above, along with an inverted NextSender signal 212 that may be generated by an inverter 210. If the channel unit is not currently the next sender, then the inverted NextSender signal is low, and the AND gate 200 allows the Contend signal 202 to go high and the Contending signal 170 to go high one clock cycle later. If another channel unit has already been designated as the NextSender by the contention system, in accordance with the invention, the TB bus will be pulled low during the second contention bit, causing the OtherCardWon signal 196 to go high and preventing the particular channel unit for contending on the third through thirteenth contention bits. If there is no next sender, the channel unit will continue contending for access to the TDATA bus until the contention logic loses a contention bit, as described above, and the OtherCardWon signal 196 goes high. If the particular channel unit is still contending for access (the Contend signal is high) to the TDATA bus when the fourteenth contention bit is detected, it has won the contention. In this case, a latch 214, that may be a flip flop, will be set because the LastBit signal is high and the Contend signal is high so that the flip flop may output a 1 on the NextSender signal 168. If any other channel unit wins the contention by the fourteenth bit, when the LastBit signal goes high and the OtherCardWon signal 196 will also be high which causes an output of a logic AND gate 216 to go high, which in turn sets a latch 218, that may be a flip flop. When the latch 218 is set, an OtherNextSender signal 220 may be generated. It should be clear that the NextSender and OtherNextSender cannot both go high so there is only a single NextSender.

If the particular channel unit shown is the NextSender, then that channel unit will become, at the end of the current frame, the CurrentSender and will have control of the TDATA bus. The NextSender signal 168 and the output of an OR gate 222 may be ANDed by an AND gate 224, which sets a latch 226, that may be a R-S flip flop, and generates the CurrentSender signal 124 and feeds that signal into the first bit of the multiplexer. The output of the OR gate 222 may go high when a NoCurrentSender signal 228 or the EndofFlag signal 142 goes high. The NoCurrentSender signal 228 may be generated by a latch 230, that may be a flip flop, which samples the TB bus during the first contention bit (as indicated by a high FirstBit signal 186) to determine if any of the channel units pulled the TB bus low during the first contention bit. The condition of no CurrentSender will only occur if the CurrentSender was interrupted from completing its transmission (for example, being physically removed from the channel bank) which would cause the EndofFlag signal 142 to never go high. Thus, determining if there is a CurrentSender at the beginning of each contention period prevents this lock-up from occurring.

Once the channel unit has become the CurrentSender, it may also remain the NextSender if the DataAvail signal 138 is low in order to prevent another channel unit from becoming the NextSender and then trying to become the CurrentSender which would cause a conflict. To release the Next- Sender signal, the DataAvail signal 138 goes high, as described above, which causes the output of an AND gate 232 to go high which resets the latch 214 so that the NextSender signal goes low and another channel unit may become the NextSender.

Once the channel unit releases the NextSender signal, all of the other channel units within the communications system may again contend to be the NextSender, which causes the OtherNextSender signal to go high. If the channel unit has completed sending its packets of data, then the Endofflag signal 142 goes high, and the NextSender becomes the CurrentSender. If there is no NextSender, then the channel unit shown will continue to be the CurrentSender and send flags until a NextSender is selected. Now, the priority system and the fairness bit determining system will be described.

As described above, during the third through seventh contention bits, the priority of the data that each channel unit wants to send is sent over the TB bus. During any contention period as a winning priority is determined, it may be clocked into a shift register 234. The shift register then outputs a signal that causes a memory 236 to output a fairness bit for the winning priority as a Fairness signal 180. This fairness bit prevents a channel unit that has sent data at the winning priority level from becoming the NextSender again for that winning priority level until all of the other channel units with the same priority data have had a chance to control the TDATA bus and send packetized data over the communications link. If the channel unit shown wins the contention and will become the NextSender, as described above, the Contend signal 202 will be high when the LastBit signal 180 is high, so that an OR gate 236 may output a high signal, and the output of an AND gate 238 connected to the LastBit signal and the Contend signal will go high which causes a write pulse to be input to the memory 236. The write pulse causes a "0" to be written into the memory, resetting the fairness bit for the shown channel unit and making it harder for the shown channel unit to win the contention again at the same priority level until all of the other channel units have had a chance to send data at that priority level during the time interval, as described above. The fairness bit may be reset to "1" if any other channel unit wins the contention process with a fairness bit set to "0". This will only happen if all cards that were contending at that priority level already have their fairness bits sent to 0.

If some other channel unit won the contention at a particular priority level with a fairness bit set to "0", then the shown channel unit wants to reset its fairness bit for that particular priority level to "1" so that the shown channel unit may have a better chance to win the contention process the next time at that priority level. To accomplish this, a latch 240, that may be a flip flop, may be initially set by the FirstBit signal 186. An AND gate 242 resets the latch 240 when the signal 192, during the second or eighth contention bits, is high and the TB bus signal is low. A low TB bus signal during the second contention bit indicates that a NextSender has been selected, and a low TB bus signal during the eighth contention bit indicates that the NextSender had a fairness bit for its particular priority of "1". Thus, latch 240 will only remain set if there is no NextSender and the fairness bit of the card that will become the new NextSender was "0". If the output of latch 240 goes high and the OtherCardWon signal 196 is high, then the output of an AND gate 244 may also go high. If these conditions occur, then the channel unit shown wants to set its fairness bit for that particular priority to "1" so that it will have a better opportunity to gain access to the TDATA bus for that particular priority level data before any other channel unit that has already sent data at that priority level. Now the format of the contention bits and the contention process will be described in more detail.

Figure 7:
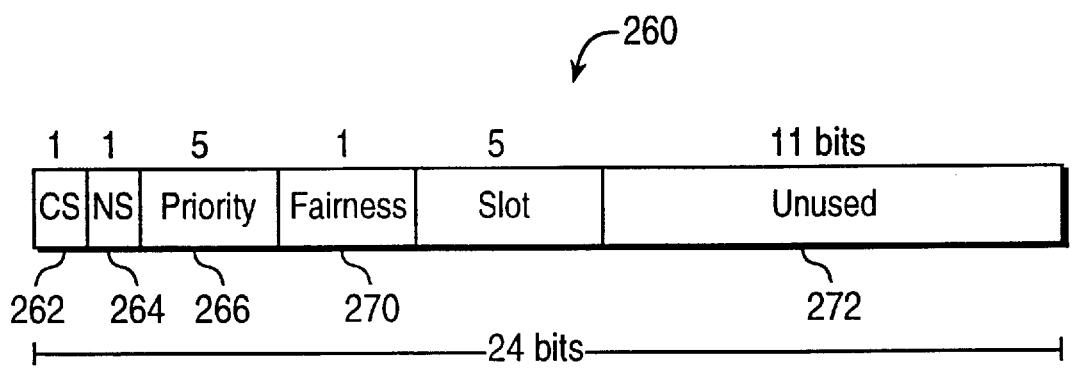
FIG. 7 is a diagram showing a format of the contention bits on a contention bus in accordance with the invention.

FIG. 7 is a diagram showing a 24-bit contention signal 260 in accordance with the invention. As described above, each channel unit generates each one of the contention bits until that channel unit has lost the contention process. The contention bits are compared starting at a first bit. As shown, the contention signal may have a number of individual contention bits that are separately generated and output over the contention bus, as described above. A first contention bit 262 is a CurrentSender (CS) bit. As described above, the multiplexer in the contention logic of FIG. 6 outputs a high "1" signal when, for example, a particular channel unit is sending data, but the signal may be inverted so that a "0" may be actually output over the TB bus. In this description, the output over the TB bus will be described. Therefore, the CS bit may usually be "0" indicating that a channel unit is already currently sending packets of data. As described above, this CS bit may be ignored for purposes of determining which channel unit will be the NextSender, but may be monitored by a current NextSender to determine when the CurrentSender has finished sending data or to immediately transfer control of the bus to the NextSender if the CurrentSender is interrupted in its transmission of data.

A second contention bit 264 (NS) indicates whether a particular channel unit has already won the contention and has become the next channel unit to send data. If the NS bit is "0", then there is a channel unit already waiting to send data and this channel unit will win any contention process until it can send its data because the NS bit is the second contention bit and the NS contention bit is the first contention bit that is compared. As described above, this ensures that the channel unit, waiting to send data, does not have its access to the TDATA bus stolen by another channel unit until that channel unit has sent its packetized data. If the NS bit is "1", then the next channel unit to send data has not been determined and each channel unit may compete using the third through thirteenth contention bits. These contention bits are priority bits (bits 3–7), a fairness bit (bit 8), and a slot address (bits 9–13). A set of priority bits 266, which may be 5 bits long, may be set by the communication software or hardware depending on the amount of data packets allocated to each channel unit and the current number of data packets sent by the channel unit compared to the allocation. The priority bits are sent such that the most significant bit is sent first. With a 5-bit signal, thirty-two priority levels are available. Assuming that the NS bit is "1", then the channel unit with the highest priority will win the contention process.

A fairness bit 268 may be generated by the contention logic and may be used to determine which channel unit becomes the next sender when the channel units have the same priority data. If the fairness bit of a particular channel unit for a particular priority is "0", then that particular channel unit has not sent data at that priority level. If the fairness bit is "1", then the particular channel unit has already sent data at that priority level and may not send data again at that priority level until all of the other cards with packetized data waiting to be sent at that priority have had a chance to send data at that priority level. The fairness bit prevents a single channel unit from monopolizing the bandwidth of the communications systems and enforces a round-robin approach. If the two channel units have different priorities, then the fairness bit is not used.

Finally, a set of slot bits 270, indicate the physical location of each channel unit within the communications system. If all of the other contention bits for all of the channel units are the same, then the channel unit with the highest slot address will become the next channel unit to send data. A set of unused bits 272 complete the 24-bit contention signal. The CurrentSender must monitor the contention bus to determine if a NextSender has been determined. If bits 2–13 of a contention period are "1", no NextSender has been determined and the CurrentSender sends flags, as described above, until a NextSender has been determined. Thus, the CurrentSender holds the data bus until a NextSender has been determined. Now, the contention process will be described.

Figure 8:
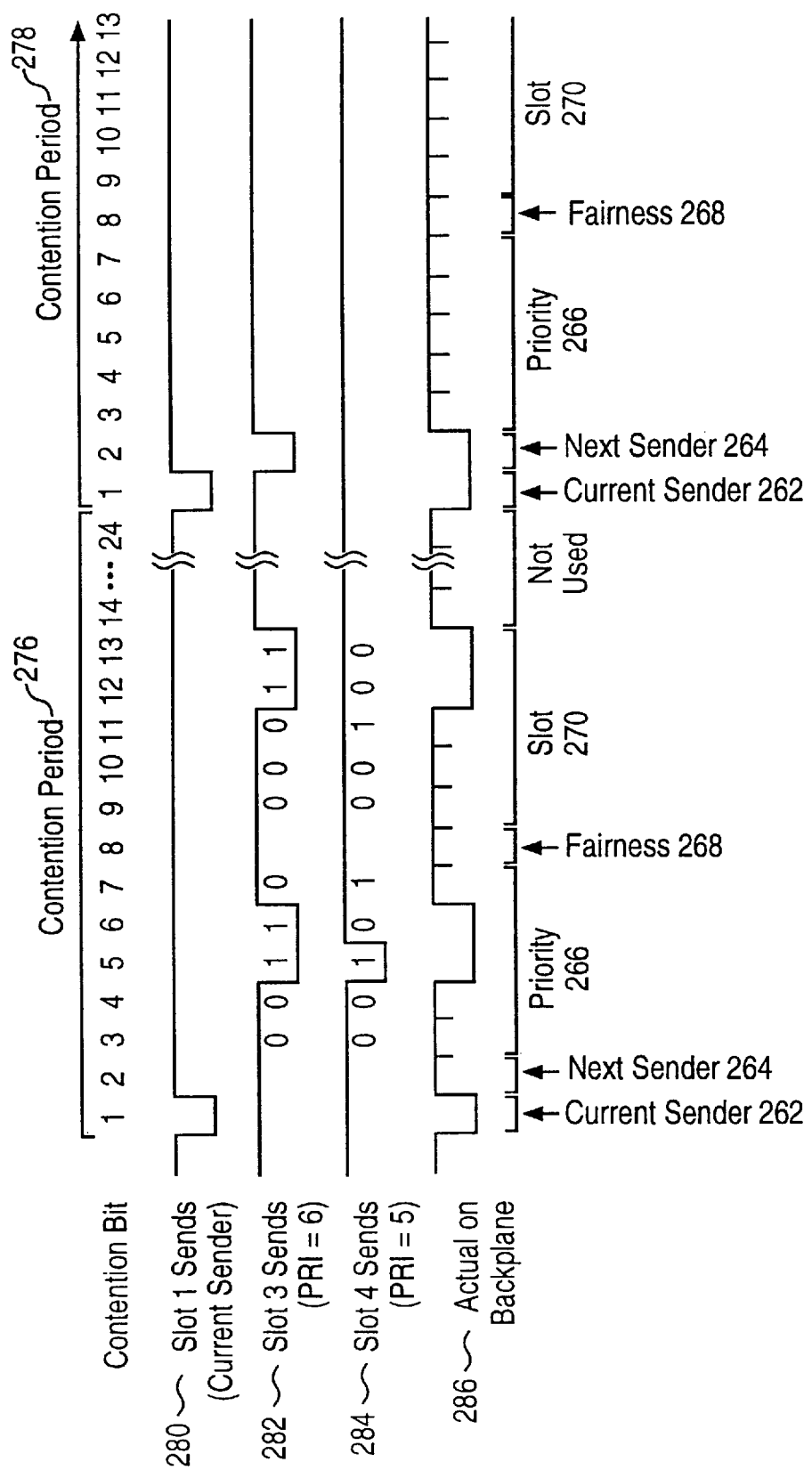
FIG. 8 is a timing diagram showing an example of a contention process in accordance with the invention between channels having different priorities.

FIG. 8 is a timing diagram showing an example of the contention process between three channel units having different priorities. As shown, a first contention period 276 and a second contention period 278, each being 24 bits long, are shown. A signal 280 for a channel unit in slot 1, which is the lowest slot address, a signal 282 for a channel unit in slot 3, a signal 284 for a channel unit in slot 4, and a resultant signal 286 on the contention bus are shown. As described above, each channel unit compares its contention bits with the contention bus to determine whether it has won the contention. In this example, channel unit in slot 1 is the CurrentSender of data so that the CS bit is low, and the resultant signal on the contention bus is also low for both of the contention periods shown. This channel unit does not contend to be the next sender of data, in this example, because it has no additional data to send.

In the first contention period 276, the NS bit 264 generated by the channel units in the third and fourth slots are both high indicating that a next sender of data has not been chosen yet, so the contention process continues. Next, the channel units generate the priority bits 266. In this example, the channel unit in the third slot has a priority of six, which is 00110 in binary. This signal is inverted so that the output signal is 11001. Similarly, the channel unit in the fourth slot has a priority of five, which is 00101 in binary and inverted to be 11010. When these two priority bits are compared, the channel unit is slot three wins because it has the higher priority, which is reflected by the signal 186 on the contention bus having the same result. Therefore, the rest of the contention bits from the channel unit in the third slot will be transferred to the contention bus, as shown.

During the second contention period 278, the channel unit in the third slot has won the previous contention process, but has not yet sent any data. Therefore, its NS bit is low which also pulls the contention bus low. Thus, during the second contention period, no contention occurs because the third slot channel unit has already won the contention process, but is still waiting to send its data. Now, a contention process in which the channel units have the same priority, but and the same fairness bits will be described.

Figure 9:
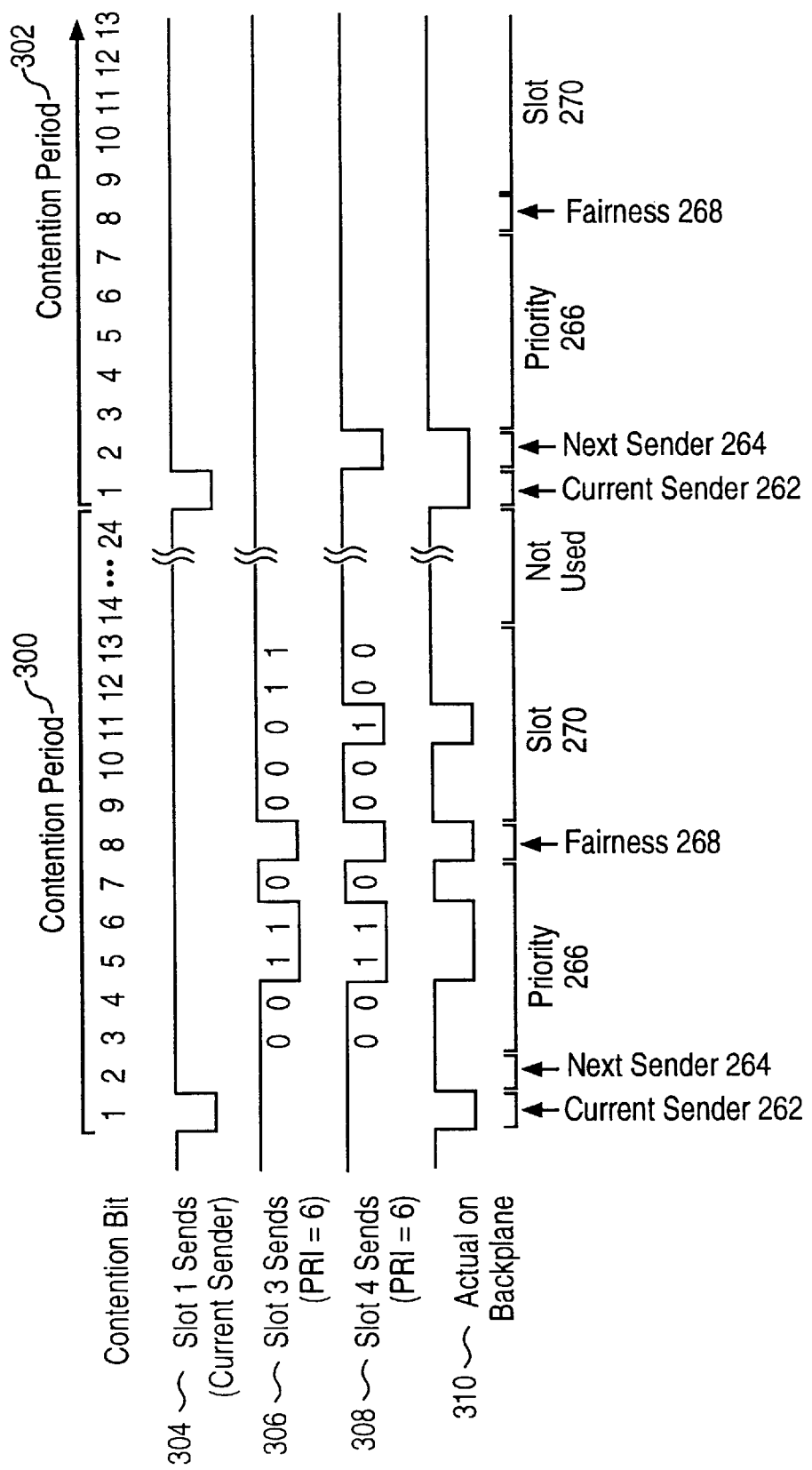
FIG. 9 is a timing diagram showing an example of a contention process in accordance with the invention between channels have the same priorities and the same fairness bits.

FIG. 9 is a timing diagram showing an example of the contention process between three channel units having the same priorities, but different fairness bits. As shown, a first contention period 300 and a second contention period 302, each being 24 bits long, are shown. A signal 304 for a channel unit in slot 1, which is the lowest slot address, a signal 306 for a channel unit in slot 3, a signal 308 for a channel unit in slot 4, and a resultant signal 310 on the contention bus are shown. In this example, channel unit in slot 1 is the CurrentSender of data so that the CS bit 262 is low, and the resultant signal on the contention bus is also low for both of the contention periods shown. As described above, this channel unit does not contend to be the next sender of data, in this example, because it has no additional data to send.

In the first contention period 300, the NS bit 264 generated by the channel units in the third and fourth slots are both high indicating that a next sender of data has not been chosen yet, so the contention process continues. Next, the channel units generate the priority bits 266. In this example, each channel unit has a priority of six, which is 00110 in binary. This signal is inverted so that the output signal is 11001. In this example, both of the channel units have the same priority so the contention process continues. Next, the channel units generate a fairness bit 268. In this example, the channel units in both slots have a fairness bit of "0" indicating that neither channel unit has sent data with a priority of six before. Since these signal are the same, the contention process continues and the resultant signal 310 on the contention bus is the same as the contention bits for all of the channel units. Next, each channel unit generates its slot number, which is 00011 for slot three and 00100 for slot four. As above, these signals are inverted and the channel unit is slot four wins the contention because that channel unit has a higher slot number.

During the second contention period 302, the channel unit in the fourth slot has won the previous contention process due to its higher slot number, but has not yet sent any data. Therefore, its NS bit is low which also pulls the contention bus low. Thus, during the second contention period, no contention occurs because the fourth slot channel unit has already won the contention process, but is still waiting to send its data.

If two contending channel units have the same priority, but different fairness bits, then the channel unit with the "0" fairness bit will win the contention period. The fairness bit provides a round robin mechanism in which a channel unit that has sent data at a particular priority level may not send data again at that priority level until all of the other channel units within the communication systems have sent data at the particular priority level only if there is pending packetized data to be sent at that priority level. For example, if a channel unit is a CurrentSender, has a fairness bit set to "0", finishes sending its data, but has other packetized data at a particular priority level to send, then that channel unit may send the other data at the particular priority level provided that no other channel unit currently has packetized data waiting to send at the particular priority level.

While the foregoing has been with reference to a particular embodiment of the invention, it will be appreciated by those skilled in the art that changes in this embodiment may be made without departing from the principles and spirit of the invention, the scope of which is defined by the appended claims.

We claim:

1. An apparatus for communicating packetized data over a communications link using a channel bank having a time division multiplexing addressing scheme, the communications link having a predetermined format for data transmitted over the communications link including a framing bit and a frame period defined by the framing bit, the apparatus comprises:

a plurality of channel units for generating packetized data, each piece of packetized data having a packet period corresponding to a sufficient amount of time to communicate the packetized data over the communications link;

means for allocating the communication link to a channel unit that is currently sending data over the communications link for the packet period;

means for skipping the framing bit when communicating said packetized data if the framing bit occurs during the packet period;

means for determining a next sender of packetized data over the communications link, the determining means being distributed over the plurality of channel units so that each channel unit independently determines whether it is the next sender; and means for allocating the communications link to the channel unit that is the next sender of packetized data after said packet period so that the time division multiplexing addressing scheme of the channel bank is ignored, and the channel bank is communicating packetized data.

2. The apparatus of claim 1, wherein the determining means comprises a determining unit located within each channel unit and a bus connecting each of said determining unit within each channel unit, said bus comprises a signalling bus normally used for voice communications located within the channel bank.

3. The apparatus of claim 2, wherein said channel bank comprises a D4 channel bank having a TA bus, a TB bus and a TPAM bus, and wherein said signalling bus comprises one of the buses in the D4 channel bank.

4. The apparatus of claim 3, wherein said packetized data is in a frame relay format.

5. The apparatus of claims 2, wherein each determining unit comprises means for generating a plurality of contention periods, and means for generating a next sender signal during said contention periods and wherein the next sender signal generating means further comprises means for generating a plurality of contention signals for each channel unit, means for sending each contention signal over said bus, and means for comparing each contention signal to the corresponding contention signal for every other channel unit to determine the next sender.

6. The apparatus of claim 5, wherein said packetized data is allocated a particular priority selected from a predetermined number of different priorities, the priority being based on data rate allocated to each channel unit, and wherein means for generating the contention signal comprises means for generating a fairness signal for preventing a channel unit that has sent packetized data having a particular priority from sending additional data having that particular priority until the other channel units have also had a chance to send data having that particular priority.

7. The apparatus of claim 6, wherein means for generating the contention signals further comprises means for generating a current sender signal indicating the channel unit that is the current sender of packetized data, means for generating a next sender signal indicating the channel unit that is the next sender of packetized data, means for generating a priority signal indicating a particular priority of packetized data being to be communicated by the channel unit selected from said predetermined number of different priorities, and means for generating a slot signal indicating a slot address of a channel unit within said channel bank.

8. The apparatus of claim 1 further comprising means for retaining the communications link by the channel unit that is the current sender of packetized data if no next sender of packetized data has been determined.

9. A method for communicating packetized data over a communications link using a channel bank having a time division multiplexing addressing scheme, the communications link having a predetermined format for data transmitted over the communications link including a framing bit and a frame period defined by the framing bit, the method comprises:

generating packetized data by a plurality of channel units, each piece of packetized data having a packet period corresponding to a sufficient amount of time to communicate the packetized data over the communications link;

allocating the communication link to a channel unit that is currently sending data over the communications link for the packet period;

skipping the framing bit when communicating said packetized data if the framing bit occurs during the packet period;

determining a next sender of packetized data over the communications link, the determining system being distributed over the plurality of channel units so that each channel unit independently determines whether it is the next sender; and allocating the communications link to the channel unit that is the next sender of packetized data after said packet period so that the time division multiplexing scheme of the channel bank is ignored, and the channel bank is communicating packetized data.

10. The method of claim 9, wherein determining comprises using a signalling bus located within the channel bank which is normally used for voice communications.

11. The method of claim 10, wherein said channel bank comprises a D4 channel bank having a TA bus, a TB bus and a TPAM bus, and wherein using said signalling bus comprises selecting said signalling bus from one of the buses in the D4 channel bank.

12. The method of claim 11, wherein said packetized data is in a frame relay format.

13. The method of claim 10, wherein determining comprises generating a plurality of contention periods, and generating a next sender signal during said contention periods wherein the next sender signal generating further comprises generating a plurality of contention signals for each channel unit, sending each contention signal over said bus, and comparing each contention signal to the corresponding contention signal for every other channel unit to determine the next sender.

14. The method of claim 13, wherein said packetized data is allocated a particular priority selected from a predetermined number of different priorities, the priority being based on data rate allocated to each channel unit, and wherein generating the contention signal comprises generating a fairness signal for preventing a channel unit that has sent packetized data having a particular priority from sending additional data having that particular priority until the other channel units have also had a chance to send data having that particular priority.

15. The method of claim 14, wherein generating the contention signals further comprises generating a current sender signal indicating the channel unit that is the current sender of packetized data, generating a next sender signal indicating the channel unit that is the next sender of packetized data, generating a priority signal indicating a particular priority of packetized data being to be communicated by the channel unit selected from said predetermined number of different priorities, and generating a slot signal indicating a slot address of a channel unit within said channel bank.

16. The method of claim 9 further comprising retaining the communications link by the channel unit that is the current sender of packetized data if no next sender of packetized data has been determined.

17. An apparatus for communicating packetized data over a communications link, the communications link having a predetermined format for data transmitted over the communications link, the apparatus comprises:

a plurality of channel units for generating packetized data, the packetized data having an allocated priority selected from a predetermined number of priorities;

means for allocating the communication link to a channel unit that is currently sending data over the communications link for a time sufficient to enable the current sender to communicate its packetized data over the communications link;

means for generating a fairness period during which each channel unit has the opportunity to communicate a predetermined amount of packetized data;

means for generating a fairness signal for each channel unit indicating whether that channel unit has previously sent a predetermined amount of packetized data at a particular priority level during the fairness period;

means for determining a next sender of packetized data over the communications link based on said fairness signal, the determining means being distributed over the plurality of channel units so that each channel unit independently determines whether it is selected to be the next sender; and means for allocating the communication link to the next sender of packetized data after said current sender has finished sending its packetized data.

18. The apparatus of claim 17, wherein the means for generating the fairness signal comprises means, within each channel unit, for generating a fairness bit corresponding to each of the priorities; and means for setting the fairness bit for a particular priority once the channel unit has sent its packetized data at the particular priority.

19. The apparatus of claim 18, wherein said means for generating the fairness bit further comprises means for resetting the fairness bit once all of the channel units that have packetized data to send at a given priority have sent packetized data at that priority level during the fairness period.

20. The apparatus of claim 19, wherein said means for determining the next sender comprises means for selecting a channel unit, from channel units having the same priority, but different fairness bits for that priority, the channel unit having a reset fairness bit for that priority.

21. The apparatus of claim 20, wherein said means for determining further comprises means for resetting the fairness bit of a channel unit for a particular priority when another channel unit becomes the next sender at that particular priority with a set fairness bit for that priority.

22. The apparatus of claim 21, wherein said predetermined amount of packetized data comprises a fixed number of frames of packetized data.

23. The apparatus of claim 21, wherein said predetermined amount of packetized data comprises a fixed number of bytes.

24. The apparatus of claim 21, wherein said predetermined amount of packetized data comprises a combination of a fixed number of frames of packetized data and a fixed number of bytes of packetized data.

25. A method for communicating packetized data over a communications link, the communications link having a predetermined format for data transmitted over the communications link, the method comprises:

generating packetized data by a plurality of channel units, the packetized data having an allocated priority selected from a predetermined number of priorities;

allocating the communication link to a channel unit that is currently sending data over the communications link for a time sufficient to enable the current sender to communicate its packetized data over the communications link;

generating a fairness period during which each channel unit has the opportunity to communicate a predetermined of packetized data;

generating a fairness signal for each channel unit indicating whether that channel unit has previously sent a predetermined amount of packetized data at a particular priority level during the fairness period;

determining a next sender of packetized data over the communications link based on said fairness signal, the determining means being distributed over the plurality of channel units so that each channel unit independently determines whether it is selected to be the next sender; and allocating the communication link to the next sender of packetized data after said current sender has finished sending its packetized data.

26. The method of claim 25, wherein generating the fairness signal comprises generating within each channel unit a fairness bit corresponding to each of the priorities, and setting the fairness bit for a particular priority once the channel unit has sent its packetized data at the particular priority.

27. The method of claim 26, wherein generating the fairness bit further comprises resetting the fairness bit once all of the channel units that have packetized data to send at a given priority have sent packetized data at that priority level during the fairness period.

28. The method of claim 27, wherein determining the next sender comprises selecting a channel unit, from channel units having the same priority, but different fairness bits for that priority, the channel unit having a reset fairness bit for that priority.

29. The method of claim 28, wherein determining further comprises resetting the fairness bit of a channel unit for a particular priority when another channel unit becomes the next sender at that particular priority with a set fairness bit for that priority.

30. The method of claim 29, wherein said predetermined amount of packetized data comprises a fixed number of frames of packetized data.

31. The method of claim 29, wherein said predetermined amount of packetized data comprises a fixed number of bytes.

32. The method of claim 29, wherein said predetermined amount of packetized data comprises a combination of a fixed number of frames of packetized data and a fixed number of bytes of packetized data.

33. A method for communicating packetized data over a communications link, the communications link having a predetermined format for data transmitted over the communications link including a framing bit and a frame period defined by the framing bit, using a channel bank, the channel bank having a plurality of channel units for generating packetized data, the packetized data having an allocated priority selected from a predetermined number of priorities, the method comprises:

generating a next sender signal for each channel unit indicating the channel unit that is the next sender of packetized data;

generating a priority signal for each channel unit corresponding to the allocated priority of the packetized data to be sent by each channel unit;

generating a slot signal indicating a slot address of a channel unit within said channel bank;

generating a fairness signal for each channel unit indicating whether that channel unit has previously sent packetized data at a particular priority level;

said next sender signal, said priority signal, said slot signal, and said fairness signal for each channel unit comprising a contention signal for that channel unit; and comparing each of said contention signals from each channel unit to the corresponding contention signals from every other channel unit to determine a next sender of packetized data.

34. The method of claim 33, further comprising generating a current sender signal for each channel unit indicating the channel unit that is the current sender of packetized data.

35. The method of claim 33, wherein said contention signals for each channel unit are compared to each other during a contention period that is predetermined numbers of bits long, and wherein said next sender signal occupies a second bit position in the contention period, said priority signal occupies a third through seventh bit position in of the contention period, and said slot signal occupies a ninth through thirteenth bit position in the contention period.

36. The method of claim 34, wherein said fairness signal occupies an eighth eight bit position in the contention period and said current sender signal occupies a first bit position in said contention period.

37. The method of claim 35, wherein said contention signals are compared sequentially in bit order.

* * * * *